United States Patent

[11] 3,578,106

[72] Inventor Peter H. Ellis
  Chula Vista, Calif.
[21] Appl. No. 866,613
[22] Filed Oct. 15, 1969
[45] Patented May 11, 1971
[73] Assignee Rohr Corporation
  Chula Vista, Calif.

[54] TURBO-FAN PROPULSION SILENCING APPARATUS
  3 Claims, 2 Drawing Figs.

[52] U.S. Cl. .................................................. 181/33HC,
  239/127.3, 239/265.17
[51] Int. Cl. .................................................. B64d 33/06
[50] Field of Search ........................................ 181/33,
  33.22, 33.221, 33.222, 43, 51, 56, 60; 239/127.3,
  265.11, 265.13, 265.17

[56] References Cited
  UNITED STATES PATENTS
  3,053,340  9/1962  Kutney ........................ 239/265.17
  3,262,264  7/1966  Gardiner et al. ............... 239/127.3
  3,463,402  8/1969  Langston ...................... 181/33(.221)
  3,527,317  9/1970  Motsinger ..................... 181/52X
  FOREIGN PATENTS
  1,254,777  1/1961  France ......................... 181/33(.221)

Primary Examiner—Robert S. Ward, Jr.
Attorneys—Edwin D. Grant and George E. Pearson ABSTRACT: The base of a hollow cone is attached to the aft edge of a turbofan engine enclosed in a tubular housing, the aft portion of the housing being conical and concentrically disposed around the cone so as to provide an annular gap therebetween. Ducts are connected to and circumferentially spaced about the aft end of the engine casing, these ducts extending rearwardly from the latter and through holes in the cone and housing and their aft ends projecting radially from the outer surface of the housing so that slipstream air flows therebetween. Engine fan air is discharged through the gap between the cone and the housing, and engine exhaust gas is discharged through the ducts.

PATENTED MAY 11 1971

3,578,106

INVENTOR.
PETER H. ELLIS
BY Edwin D. Grant

ATTORNEY

TURBO-FAN PROPULSION SILENCING APPARATUS

SUMMARY OF THE INVENTION

This invention relates to jet-propelled aircraft and more particularly to a nozzle assembly which reduces the noise associated with the operation of an aircraft engine of the turbofan type.

As is well known, the noise which results from the flow of jet engine exhaust gas through the atmosphere can be reduced by mixing cool, relatively low velocity air with such gas at the point where it is discharged from a thrust nozzle, so as to thereby lower the temperature and velocity of the thrust-producing exhaust stream. Heretofore jet engine thrust nozzles have been formed with radially projecting lobes in order to produce an exhaust stream having a daisy petal cross-sectional shape, such a nozzle projecting from the aft end of a housing associated therewith so that slipstream air flows between its lobes and mixes with the exhaust stream discharged therefrom. Although such lobed nozzles suppress the noise of jet engine exhaust streams, they effect mixing of air with such streams only at the peripheries thereof, which limits their effectiveness. To avoid this limitation in the sound suppressing capacity of lobed nozzle, aircraft jet engines have been provided with nozzles consisting of a plurality of tubes arranged in concentric, spaced rows, the tubes also projecting from the aft ends of the associated engine housings to permit slipstream air to flow therebetween and mix with exhaust gas discharged therefrom. Multitube nozzles are not completely satisfactory, however, because the volume of slipstream air which flows around the innermost tubes of such nozzles is considerably less than that which flows around the outermost tubes. Thus as in the case of lobed nozzles, most mixing of air and gas occurs at the periphery of the exhaust stream discharged from a multitube nozzle.

In contrast with nozzles of the type which have been briefly described, a thrust nozzle arranged in accordance with the present invention discharges exhaust gas of a turbofan engine in a plurality of streams which are surrounded by streams of air all flowing at a high volumetric rate, thus providing an exhaust stream in which air and gas are rapidly mixed together immediately downstream from said nozzle. More specifically, in the preferred embodiment of this invention a turbofan engine is enclosed within a tubular housing, or nacelle. The housing comprises a cylindrical portion which is disposed in concentric, spaced relation around the aft end of the engine casing, and a generally conical portion which is attached to and extends rearwardly from the aft end of the cylindrical portion. A hollow, conical inner member is attached at its base to the aft edge of the engine casing and extends rearwardly therefrom in spaced, coaxial relation with the conical aft portion of the housing, the apex of the inner member projecting from the aft end of said housing aft portion. Circumferentially spaced openings are formed in the walls of both the conical portion of the housing and the inner member, and the openings in the two components are radially aligned relative to one another. Ducts are attached to the aft end of the engine casing so that all of the exhaust gas of the engine flows therethrough, and these exhaust ducts respectively extend through the aforesaid radially aligned openings in the housing and the inner member and their aft ends terminate at the plane which includes the aft edge of said housing. The sidewalls of the aft end portions of the exhaust ducts project radially from the adjacent outer surface of the housing, and slipstream air flows between said sidewalls. Fan air of the engine is discharged to the atmosphere through the annular gap between the housing and the engine casing and the inner member attached thereto. Thus cool fan air is discharged in a substantially annular stream located inside streams of hot exhaust gas discharged from exhaust ducts which are spaced apart on a circle at the aft end of the propulsion assembly, and cool slipstream air flows between and around said exhaust gas streams, which results in rapid and thorough mixing of air with the exhaust gas immediately downstream from the exhaust ducts.

DETAILED DESCRIPTION

Figure 1:
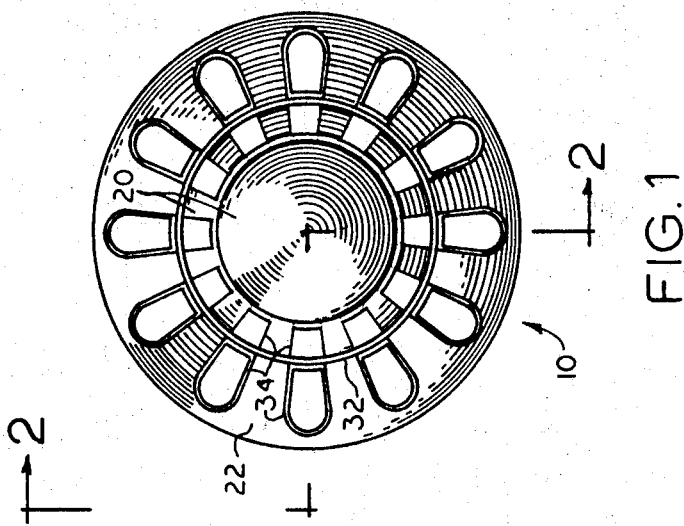
FIG. 1 is a rear elevation of the preferred embodiment of the invention.

The drawings illustrate the aft portion of a tubular housing, generally designated by reference number 10. This housing comprises a cylindrical forward section 12 that is concentrically spaced around a tubular wall 14 joined by an annular flange 16 to the casing 18 of a turbofan engine, said wall 14 to be considered as part of said casing in the interpretation of claims appended hereto. The engine casing and the forward section of the housing are coterminous, and the base of a substantially conical, hollow inner member 20 is fixedly joined to the aft edge of the casing while the base of the aft section 22 of the housing is fixedly joined to the aft edge of the forward section, the apex of said inner member projecting from the aft end of said aft section and the latter conforming with the shape of said inner member so that there is a gap 24 of substantially uniform width between housing 10 and the engine casing and the portion of the inner member disposed therein. The fan section of the engine is connected with gap 24 by means of ducts (not shown) so that fan air, represented in FIG. 2 by single-headed arrows 26, is discharged to the atmosphere through said gap.

Figure 2:
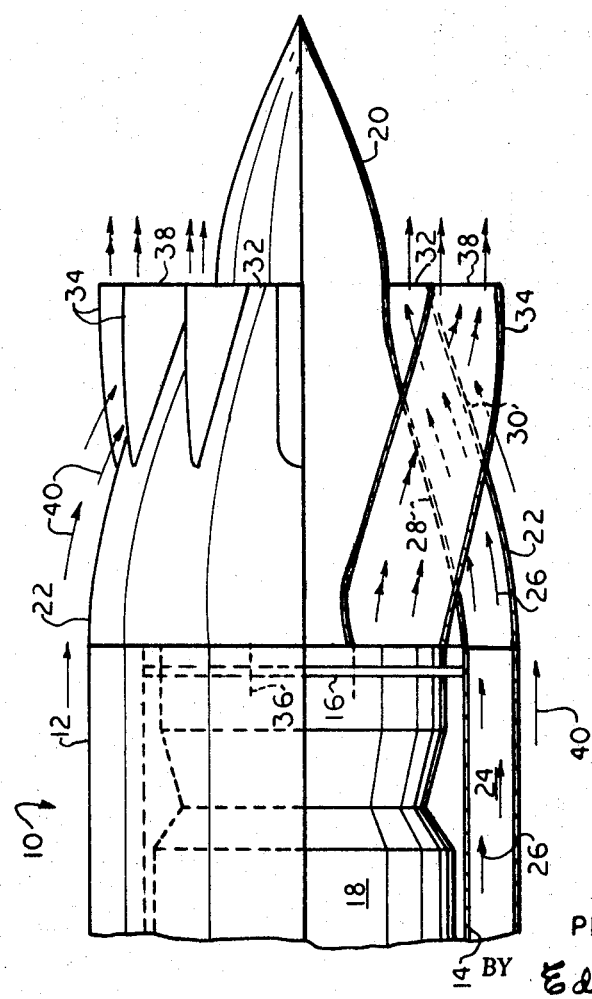
FIG. 2 is a partially sectional side elevation of the same embodiment, the section being taken along the planes represented by line 2–2 in FIG. 1.

Evenly spaced apart around both the walls of inner member 22 and the aft section of housing 10 are a plurality of openings 28, 30. Openings 28 extend close to the forward edge of inner member, and openings 30 extend still closer to the aft edge 32 of housing 10 and are respectively radially aligned with said openings 28, said aft edge 32 lying in a plane perpendicular to the common longitudinal axis of said housing and said inner member. Extending through each pair of radially aligned openings 28, 30 and sealably attached to the edges thereof is a duct 34. As illustrated in FIG. 2 wherein a typical duct is shown in longitudinal section, the forward ends of the ducts are fixedly connected to the aft edge of casing 18 and the bearing housing 36 centrally disposed within said casing, and the ducts extend axially of the inner member and housing and diverge in the downstream direction so that their sides project radially from the outer surface of said housing (see FIG. 1) and their aft edges 38 lie in the plane which includes the aft edge 32 of the housing. At the aft edge of casing 18 the sides of the ducts are joined together by curved walls (not shown) so that all of the exhaust gas discharged from said casing flows into the ducts with minimal flow resistance, this exhaust gas being represented by double-headed arrows in FIG. 2.

OPERATION

It will be manifest from the foregoing description that fan air flows between the ducts 34 in the gap 24 between housing 10 and inner member 20 and issues from the aft end of the propulsion assembly in a substantially annular stream which is located inside the streams of exhaust gas discharged from ducts 34. Slipstream air, represented by single-headed arrows 40 in FIG. 2, flows along the outer surface of housing 10 and the surfaces of ducts 34 which are exposed to the atmosphere. Thus the streams of high temperature, high velocity exhaust gas are surrounded by cool, relatively low velocity air at the point where said streams are discharged to the atmosphere. The noise emanating from the combined stream of air and exhaust gas is consequently less than that which would be emitted from a stream of exhaust gas which is mixed with air only at its periphery.

It will also be apparent that modifications can be made in the disclosed embodiment of the invention without departing from the concept thereof. For example, at the aft end of the forward section 12 of housing 10 a plurality of ducts may be provided to conduct fan air to points located between the aft ends of ducts 34. Hence the scope of the invention should be considered to be limited only by the terms of the claims appended hereto.

I claim:

1. In an aircraft wherein a turbofan engine is enclosed in a tubular housing, the combination comprising:

a plurality of ducts connected to and extending rearwardly from the aft end of said engine so that its exhaust gas is discharged therethrough, said ducts being spaced apart circumferentially of said housing and exposed to the atmosphere at the aft ends thereof so that a portion of the slipstream air flowing past said housing during the flight of said aircraft flows between said ducts and thence between the streams of exhaust gas issuing from the latter; and conduit means operatively associated with said housing and extending from the fan section of said engine to a point substantially axially aligned with the aft ends of said ducts, said conduit means being arranged so that fan air of said engine flows therethrough and is discharged therefrom in at least one stream surrounded by the exhaust gas issuing from said ducts.

2. In an aircraft having a turbofan engine, the combination comprising:

a hollow inner member the forward edge of which is fixedly attached to the aft edge of the casing of said engine, said inner member extending rearwardly from said casing in substantially coaxial relation therewith and a plurality of circumferentially spaced openings being formed in the wall thereof;

a tubular housing disposed in spaced relation around said casing and inner member and at least the aft portion of which is exposed to the atmosphere, fan air of said engine flowing through the space between said housing and said casing and inner member and discharging to the atmosphere at the aft end of said housing, a plurality of circumferentially spaced openings being formed in the wall of said housing and respectively radially aligned with the openings in said inner member; and a plurality of ducts connected to the aft end of said engine so that its exhaust gas is discharged therethrough, said ducts being spaced apart circumferentially of said housing and respectively extending through the radially aligned openings in said inner member and housing in sealed relation with the edges of said openings, the aft ends of said ducts being substantially coterminous with the aft end of said housing and projecting radially from said housing so that slipstream air flowing past the latter during the flight of said aircraft passes therebetween.

3. The combination defined in claim 2 wherein said inner member is substantially conical and the apex thereof projects rearwardly from said housing and ducts, and the aft portion of said housing is also conical so as to conform with said inner member.